United States Patent Office 3,202,507
Patented Aug. 24, 1965

3,202,507

PHOTOGRAPHIC METHOD USING A LIGHT SENSITIVE VISIBLE IMAGE-BEARING MASKING LAYER WHICH INCLUDES AN ANTI-HALATION LAYER

Robert H. Sprague, Chagrin Falls, and John A. Stewart, Parma, Ohio, assignors to Horizons Incorporated, a corporation of New Jersey No Drawing. Filed Nov. 22, 1961, Ser. No. 154,331
3 Claims. (Cl. 96—27)

This invention relates to the prevention of fogging during diazo printing from light sensitive masters produced as described in United States patent application 842,569, filed September 28, 1959, by Eugene Wainer, which issued on July 3, 1962, as United States Patent 3,042,517, and in related applications disclosing improvements related thereto, all of said applications being based on a latent image photosystem in which an N-vinylamine and a free-radical producing organic halogen compound constitute the essential constituents.

In practicing the invention described in the aforementioned Wainer application, a particularly preferred N-vinylamine is N-vinylcarbazole and particularly preferred free radical sources are organic compounds represented by the general formula $$A—C—X_3$$

wherein A represents a monovalent radical selected from the group consisting of hydrogen, halogen other than F, alkyl, substituted alkyl, aryl and substituted aryl, and each X is a halogen selected from the group consisting of Cl, Br and I; Br being the preferred species of halogen and carbon tetrabromide ($CBr_4$), pentabromoethane ($C_2Br_5H$) and hexabromoethane ($C_2Br_6$) representing species which have been found to be exceptionally effective with N-vinylcarbazole and other N-vinylamines.

In the photographic process wherein the above ingredients are employed, a supported photosensitive film is prepared by casting a solution containing the N-vinylamine and free-radical producing organic halogen compound of the type indicated onto a solid support which is preferably a translucent or transparent synthetic polymer or glass and drying the resulting film by evaporation of the solvent, or if a film-forming plastic is included in the solution cast on the solid support, casting of the solution on the support and drying yields a self-sustaining film upon elimination of the solvent and the film, when stripped from the support, consists of the N-vinylamine and organic halogen compound dispersed in the film of film-forming plastic.

In either event, the resulting film is very sensitive to radiant energy and a visible colored image is produced by exposure of the film to radiant energy of suitable wave length, exposure being used in the photographic sense. Specifically, the compositions are particularly sensitive to radiation in the ultraviolet and retain some sensitivity to the ultraviolet even after the "fixing" of the exposed film, e.g., by subsequent exposure to infra-red, or by other suitable treatment.

Consequently in order to utilize the image bearing film as a master for the production of diazo prints, or other prints involving exposure to large doses of ultraviolet radiation, it has been found necessary to provide means to prevent fogging of the film.

The use of ultraviolet absorbers as suggested in the aforementioned Wainer application, does not solve the problem since these were added to the solution of the photosensitive mixture with the aim of increasing ultraviolet light sensitivity of the resulting film and hence tend to augment the problem rather than ameliorate it.

In the present invention, fogging of the image bearing film is prevented by a thin coating layer consisting of at least one suitable ultraviolet absorbing compound dissolved in a binder solution applied as a coating on the side opposite to the light sensitive coating. When applied so as to be in physical contact with the light sensitive layer, e.g. as an overcoating on the light sensitive layer the ultraviolet absorbers were found to interfere with the image forming exposure by cutting off the required radiation and to produce, in many instances, a brown fog, possibly as a result of some chemical reaction not fully understood.

Commercially available ultraviolet absorbers described below have been found to be effective in protecting the N-vinylamine and organic halogen compound containing light sensitive layer from fogging during the exposures needed to make diazo prints, and it appears that other ultraviolet absorbers could be employed in their stead with substantially equiavlent results.

Two of the types of ultraviolet absorbers found to be particularly effective for the present process comprise (1) substituted benzophenones, a very effective species being 2-hydroxy-4 methoxybenzophenone, and (2) substituted benzotriazole derivatives of which 2-(2'-hydroxy-5'-methyl phenyl) benzotriazole was found to be particularly effective.

In the examples which follow, the ultraviolet absorbers were dissolved in a binder solution and coated on the back of a Mylar polyester sheet on the side opposite the light sensitive coating. The image forming exposure was made through a negative with emulsion/emulsion contact and a visible image was then developed by exposure to infrared, which exposure also served to fix the exposed film. The resulting product was used as the master from which diazo prints were made by exposing the master through the back in contact with diazo paper in which position the ultraviolet absorber filtered out the radiation to which the N-vinylamine layer retained some sensitivity.

The examples which follow are intended to be illustrative and are not to be construed as limiting the invention.

*Example 1*

A binder solution was prepared by dissolving polystyrene in tetrahydrofuran, the relative proportions being such as to yield at 20% solution by weight. Five parts by weight of N-vinyl carbazole, as the compound, or an equivalent weight of N-vinylcarbazole dissolved in benzene, and five parts by weight of pentabromoethane or an equivalent weight of pentabromoethane dissolved in methyl ethyl ketone were dissolved in about 10 parts by weight of binder solution.

The resulting light sensitive photocomposition was coated on unsubbed 500–D Mylar polyester at a wet thickness of 0.003 inch with a Bird Applicator bar. The coating was allowed to dry in air for not less than 15 minutes.

An ultraviolet light-absorbing solution was prepared and coated on the reverse side of the photosensitized Mylar sheet, the solution consisting of one gram of 2-(2'-hydroxy-5'-methylphenyl)-benzotriazole [Tinuvin P, Geigy] dissolved in 20 cc. of 10% polystyrene in benzene. This solution was coated on the back of the sensitized Mylar sheets at .0015-inch and .003-inch wet thickness.

An image was produced in the photosensitive layer by using a line-copy negative. The exposing time was five seconds to three General Electric sunlamps at a distance of 12 inches from the bottom of the lamp to the glass in the printing frame. The sheet was then thermally developed by placing it in a convection oven at 155°–150° C. for thirty seconds.

The image was re-exposed through the ultraviolet light-absorbing back coatings for 0–10–20–30–60 minutes to three General Electric sunlamps. The coatings were cooled during the re-exposure by air from an electric fan.

Diazo prints were made on Keuffel and Esser No. 7 Blue Line Paper from strips of these transparencies alongside similar strips not having the ultraviolet-absorber back coating.

Three General Electric sunlamps at a distance of 12 inches lamp-to-test were used, and the exposure times were 30–45–60 seconds.

The diazo prints showed that, after 60 minutes of re-exposure to the ultraviolet light, the strips protected by the .003-inch wet-thickness coatings of 2-hydroxy-4-methoxybenzophenone exhibited no appreciable fog. The .0015-inch coating was slightly less effective than the .003-inch coatings. The strips unprotected by the ultraviolet-light absorber back coating were heavily fogged in the re-exposed area. The results obtained indicated that the U.V. absorber coating would enable production of over 100 prints without loss of detail due to fog.

*Example 2*

An ultraviolet-light-absorbing solution was prepared by dissolving one gram of 2-hydroxy-4-methoxybenzophenone [Cyasorb UV No. 9, Cyanamid] in 20 cc. of a solution of 10% polystyrene in benzene and coated on the back of a Mylar sheet, photosensitized and coated as described in Example 1.

Again an image was produced in the photosensitive layer by using a line-copy negative, exposing and developing as shown in Example 1. The image was re-exposed through the ultraviolet-light-absorbing back coatings in the same manner as in Example 1, exposure times and cooling method being the same as described above.

Diazo prints were then made on Keuffel and Esser No. 7 Blue Line Paper from strips of these transparencies alongside similar strips not having the ultraviolet-absorber back coating, again employing the same method and exposure times as in Example 1. The 2-hydroxy-4-methoxybenzophenone ultraviolet - light - absorber back coating was slightly more effective than the 2-(2′-hydroxy-5-methylphenyl)-benzotriazole.

*Example 3*

Tests, similar to those in Examples 1 and 2 were run, using the following ultraviolet-light absorbers:

2-hydroxy-4-methoxy-4′-chlorobenzophenone
2,2′-dihydroxy-4-methoxybenzophenone
2-hydroxy-4-methoxy-4′-methylbenzophenone
2-hydroxy-4-*n*-octoxybenzophenone Each of the above compounds gave some protection but they were somewhat less effective than the compounds employed in Examples 1 and 2.

Having now described preferred embodiments of our invention it is not intended that the invention be limited except as required by the appended claims although it is to be understood that the invention is susceptible of many modifications. For example a small amount of plasticizer may be included in the film-forming plastic-ultraviolet absorber layer, other film-forming plastics than polystyrene may be used, including polyvinyl acetate, other vinyl polymers, vinylidene polymers and copolymers, other solvents, and other variants in the composition, e.g., as described in the aforementioned Wainer application.

We claim:

1. A method of diminishing fogging of ultraviolet sensitive masters when making diazo prints from said masters which comprises providing a photographic element to be used as the master, said photographic element comprising in combination a photographic support layer, a photosensitive composition layer coated on one side of said support layer and an ultraviolet absorbing layer coated on the opposite side of said support layer, said photosensitive composition consisting essentially of an N-vinylamine and a halogen containing organic compound represented by the general formula $A—C—X_3$ wherein A is selected from the group consisting of H, Cl, Br, I, alkyl, aryl and aralkyl and each X is selected from the group consisting of Cl, Br and I;

preparing a master from said photographic element by photographically exposing the photosensitive composition thereon to a suitable dose of radiation to produce a latent image in said layer;

developing a visible image in said layer by gently heating the same;

and then preventing fogging of said masters during the making of diazo prints from said masters by positioning said photographic element during the exposure used for the making of diazo prints so that the ultraviolet absorbing layer is positioned between said image bearing layer and the illumination provided for making said diazo prints.

2. The improvement of claim 1 wherein the photosensitive composition layer consists of N-vinylcarbazole and the organic halogen compound is a lower bromoalkane selected from the group consisting of $CBr_4$, $C_2Br_6$ and $C_2HBr_5$.

3. The improvement of claim 1 wherein the ultraviolet absorber is selected from the group consisting of substituted benzophenones and substituted benzotriazoles.

References Cited by the Examiner

UNITED STATES PATENTS

| | | | |
|---|---|---|---|
| 2,913,351 | 11/59 | Ossenbrunner et al. | 96—84 X |
| 2,976,259 | 3/61 | Hardy et al. | 260—45.95 |
| 3,042,518 | 7/62 | Wainer | 96—90 |
| 3,069,268 | 12/62 | Herrick | 96—75 |

FOREIGN PATENTS 471,366 9/37 Great Britain.

NORMAN G. TORCHIN, *Primary Examiner.*